(12) United States Patent
Tronville et al.

(10) Patent No.: US 7,140,640 B2
(45) Date of Patent: Nov. 28, 2006

(54) MOTOR VEHICLE HAVING A MODULAR STRUCTURE AND A METHOD FOR ASSEMBLING IT

(75) Inventors: Pier Giorgio Tronville, Moncalieri (IT); Giorgio Cornacchia, Turin (IT)

(73) Assignee: Fiat Auto S.p.A., Turin (IT)

( * ) Notice: Subject to any disclaimer, the term of this patent is extended or adjusted under 35 U.S.C. 154(b) by 320 days.

(21) Appl. No.: 10/466,360

(22) PCT Filed: Dec. 21, 2001

(86) PCT No.: PCT/EP01/15248

§ 371 (c)(1),
(2), (4) Date: Jan. 14, 2004

(87) PCT Pub. No.: WO02/055364

PCT Pub. Date: Jul. 18, 2002

(65) Prior Publication Data

US 2004/0104568 A1    Jun. 3, 2004

(30) Foreign Application Priority Data

Jan. 16, 2001  (IT) .......................... TO2001A0024

(51) Int. Cl.
*B62D 21/00*    (2006.01)
(52) U.S. Cl. .................. 280/781; 280/785; 296/193.04
(58) Field of Classification Search ............. 280/785, 280/781, 124.109; 180/312; 296/193.01, 296/193.04, 193.05, 193.07, 193.08, 193.09
See application file for complete search history.

(56) References Cited

U.S. PATENT DOCUMENTS

| 2,549,191 | A | * | 4/1951 | Gregoire | 296/203.01 |
|---|---|---|---|---|---|
| 4,440,435 | A |  | 4/1984 | Norlin |  |
| 4,582,156 | A | * | 4/1986 | Kochy et al. | 180/90 |
| 4,730,870 | A | * | 3/1988 | DeRees | 296/193.04 |
| 4,881,756 | A | * | 11/1989 | Kumasaka et al. | 280/785 |
| 6,073,991 | A | * | 6/2000 | Naert | 296/187.02 |
| 6,237,989 | B1 | * | 5/2001 | Ammerlaan et al. | 296/178 |
| 6,640,918 | B1 | * | 11/2003 | Sorvari | 180/69.22 |
| 6,926,350 | B1 | * | 8/2005 | Gabbianelli et al. | 296/203.01 |
| 6,948,769 | B1 | * | 9/2005 | Borkowski et al. | 296/203.02 |
| 2003/0205917 | A1 | * | 11/2003 | Preisler | 296/193.07 |
| 2005/0046236 | A1 | * | 3/2005 | Nakamura et al. | 296/193.07 |
| 2005/0161935 | A1 | * | 7/2005 | Ono et al. | 280/834 |

FOREIGN PATENT DOCUMENTS

| DE | 196 06 779 A | 8/1997 |
|---|---|---|
| DE | 197 01 571 A1 | 7/1998 |
| DE | 199 13 532 A1 | 9/1999 |
| EP | 0 278 479 A | 8/1988 |
| EP | 0 622 289 A | 11/1994 |
| EP | 1 059 220 A2 | 12/2000 |
| EP | 1 125 829 A2 | 8/2001 |

* cited by examiner

Primary Examiner—David R. Dunn
Assistant Examiner—Joselynn Y. Sliteris
(74) Attorney, Agent, or Firm—Sughrue Mion, PLLC (57) ABSTRACT

A motor vehicle comprises a pre-assembled front module (1) including a support structure (2); a propulsion unit (14); a steerable front wheel assembly (17); an intermediate support structure (20) for housing and supporting a windscreen; a planar load-bearing floor structure (30); a pre-assembled intermediate module (40) including a firewall (41), instrument panel (42), steering column (43, 44) and a control pedal assembly (45); a rear pre-assembled module (50) including a support frame (51), at least one pair of rear wheels (55); an annular rear structure (60); and two side structures (70).

17 Claims, 14 Drawing Sheets

MOTOR VEHICLE HAVING A MODULAR STRUCTURE AND A METHOD FOR ASSEMBLING IT

This is a National Stage Entry of Application No. PCT/EP01/15248 filed Dec. 21, 2001; the disclosure of which is incorporated herein by reference.

BACKGROUND OF THE INVENTION

The present invention relates motor vehicle having a modular structure and to a method for assembling such a vehicle.

The object of the present invention is to provide an improved modular structure for a motor vehicle with an improved assembly method, which enable a vehicle to be assembled automatically, in particular by the procedure known as the "open sky" technique, using a small number of components, modules and pre-assembled functional sub-units, which have already been tested with regard to their specific functions by their respective manufacturers/suppliers.

This and other objects are achieved according to the invention by providing a motor vehicle with a modular structure the main characteristics of which are defined in the appended Claim 1, with an assembly method the main characteristics of which are claimed in Claim 15.

Further characteristics and advantages of the invention will become apparent from the detailed description which follows, provided purely by way of non-limitative example, with reference to the appended drawings, in which:

Figure 1:
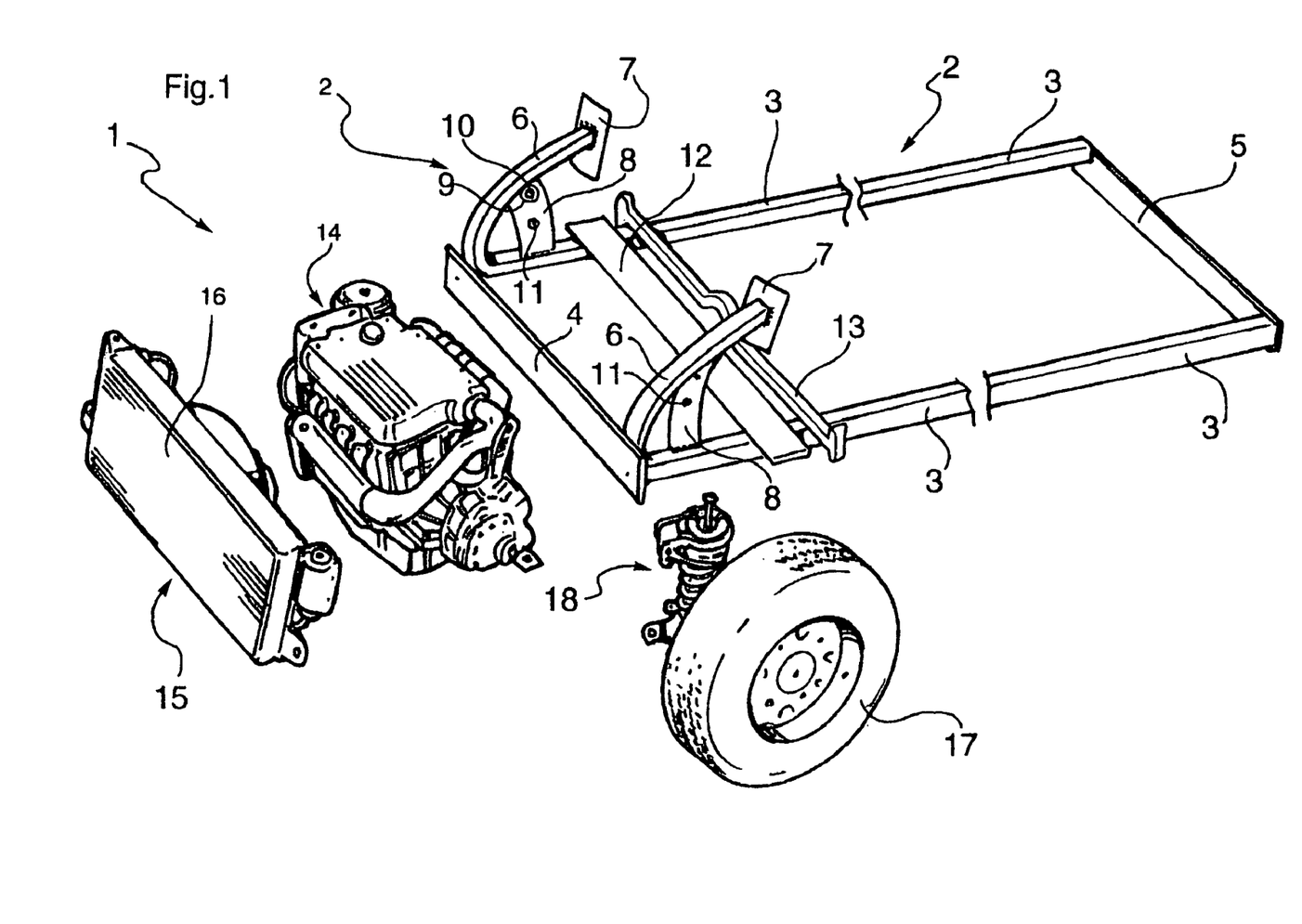
FIG. 1 is a partially exploded, partial perspective view of a first pre-assembled module, or front module of a motor vehicle of the invention.

A modular-structure motor vehicle according to the invention includes a first or front, module, which in FIG. 1 and in the subsequent drawings is generally indicated 1.

In the embodiment illustrated, the front module 1 includes a support structure 2 which includes a pair of essentially horizontal, parallel longerons 3, connected at the front by a front cross member 4 and at the rear by a cross member 5.

Two essentially symmetrical members or struts 6 extend upwardly and rearwardly from the front end of the longerons 3. Respective end plates 7 are fixed, by welding for example, to the free ends of the said struts.

A respective shaped strut 8 extends between an intermediate portion of each strut 6 and the longeron 3 associated therewith.

For convenience, the portion of each member 8 adjacent the associated strut 6 forms a so-called dome 9 with an opening 10 (see the upper portion of FIG. 1) for securing the suspension of a corresponding wheel.

A respective seat 11 is also formed in each shaped strut 8 for securing an anti-vibration support device, of a type known per se, for the propulsion assembly of the motor vehicle.

The ends of a support cross member, indicated 12 in the drawings, rest on and are fixed to the longerons 3 at the rear and near the shaped struts 8.

A further shaped member 13 rests on and is fixed to the longerons 3, by welding for example, the purpose of which will be explained later.

Figure 2:
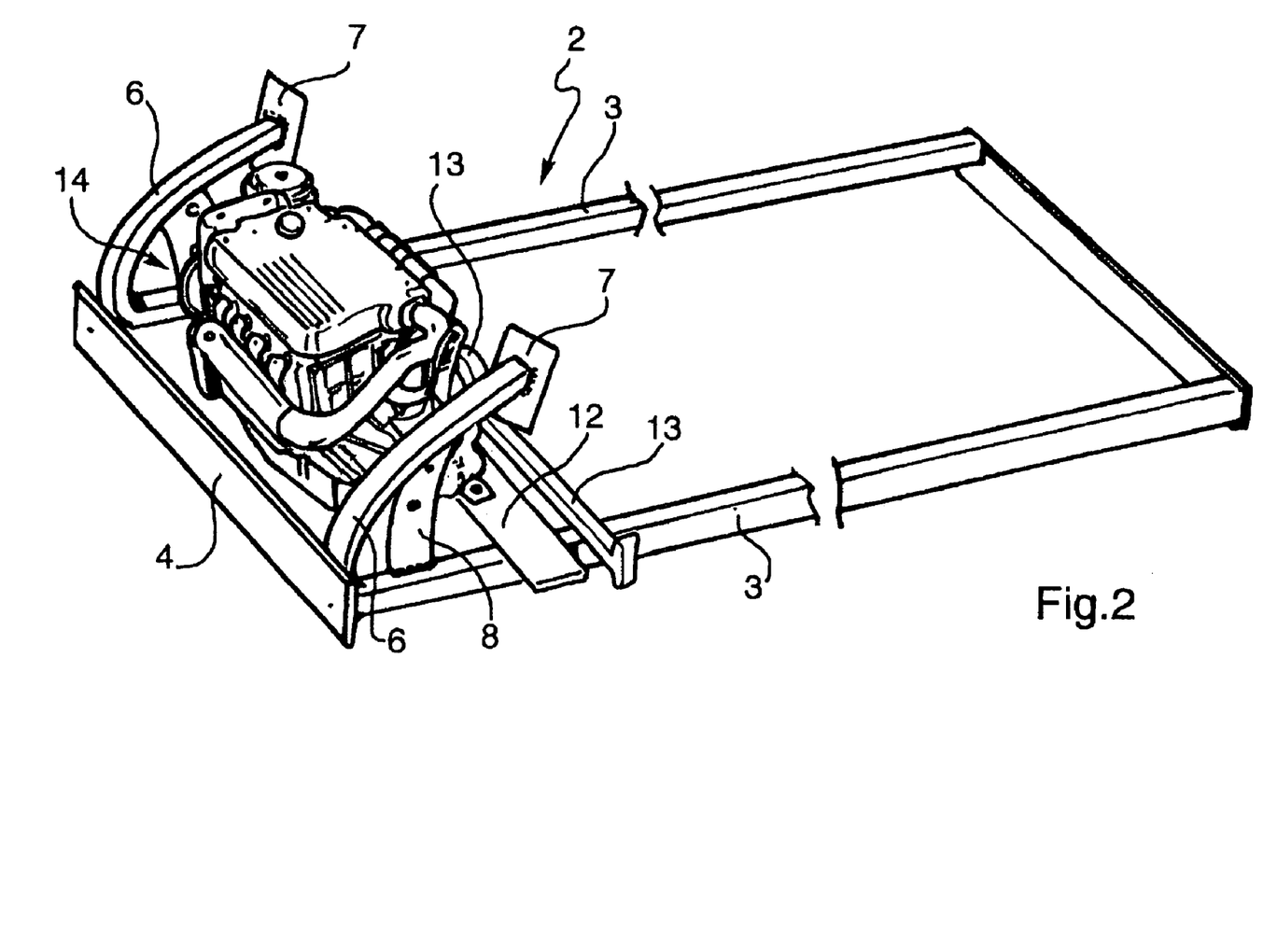
FIG. 2 is a partial perspective view showing a partly assembled front module.

The front module 1 also includes a propulsion unit, generally indicated 14, of a type known per se, ready assembled with the support structure 2 as shown, for example, in FIG. 2.

The propulsion unit is, in particular, mounted between the shaped struts 8, behind the front cross members 4.

In the embodiment illustrated in the drawings by way of example, the front module 1 also includes a front assembly 15 (see FIGS. 1 and 3 for example), fixed to the front cross member 4 and including, for example, the radiator 16 associated with the propulsion unit 14, together with accessory devices, and possibly other devices not shown in the drawings, such as the front optical units of the motor vehicle.

The front module 1 also includes a pair of steerable front wheels 17 (only one of which is shown in FIG. 1), coupled to the propulsion assembly 14 in a manner known per se, and associated suspension devices 8, also of a known type, connected to the support structure 2 and in particular to the shaped struts 8 and to the longerons 3.

Figure 3:
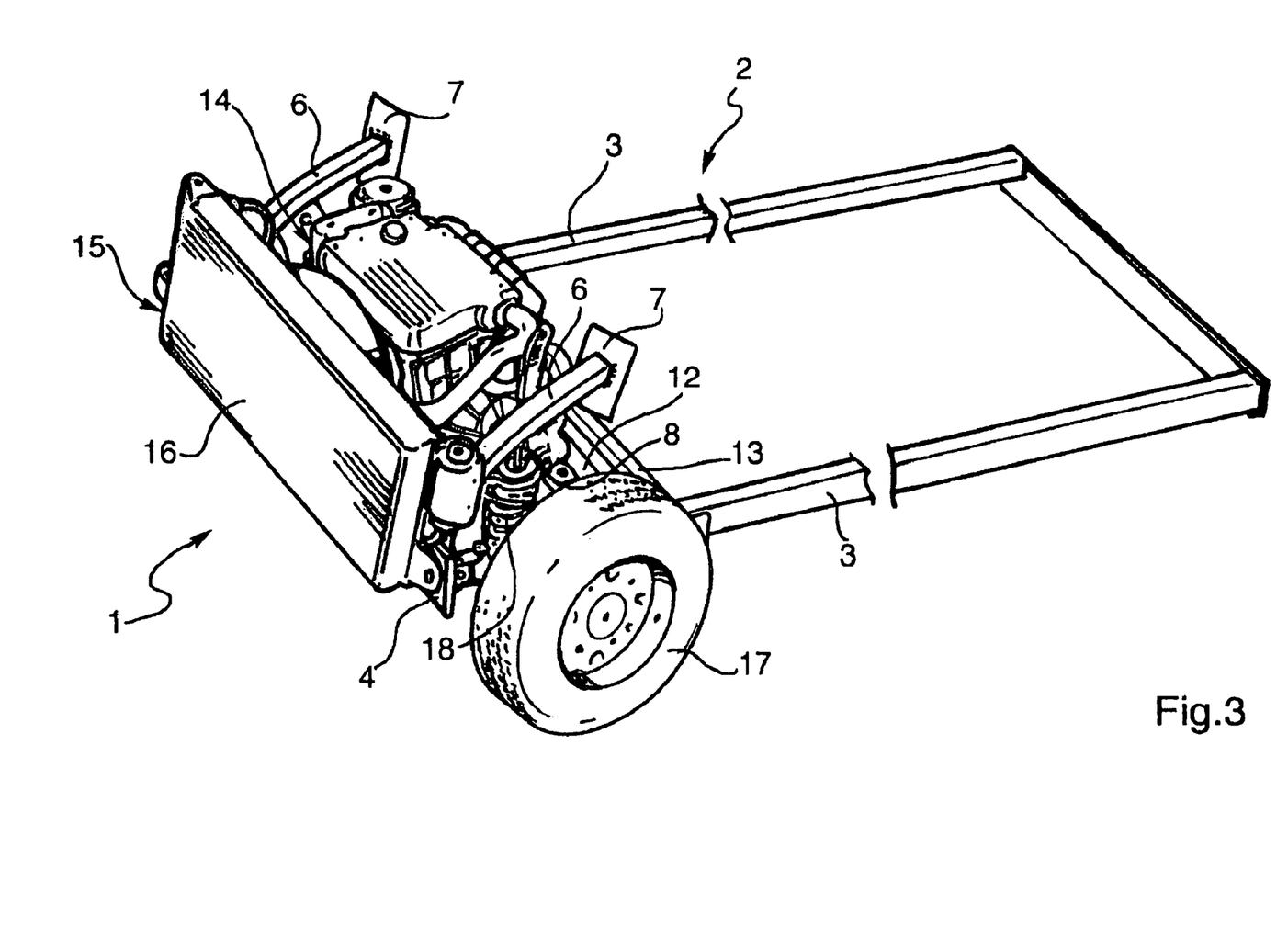
FIG. 3 is a perspective view of a fully assembled front module.

The front module 1 is shown in its assembled condition in FIG. 3.

Figure 4:
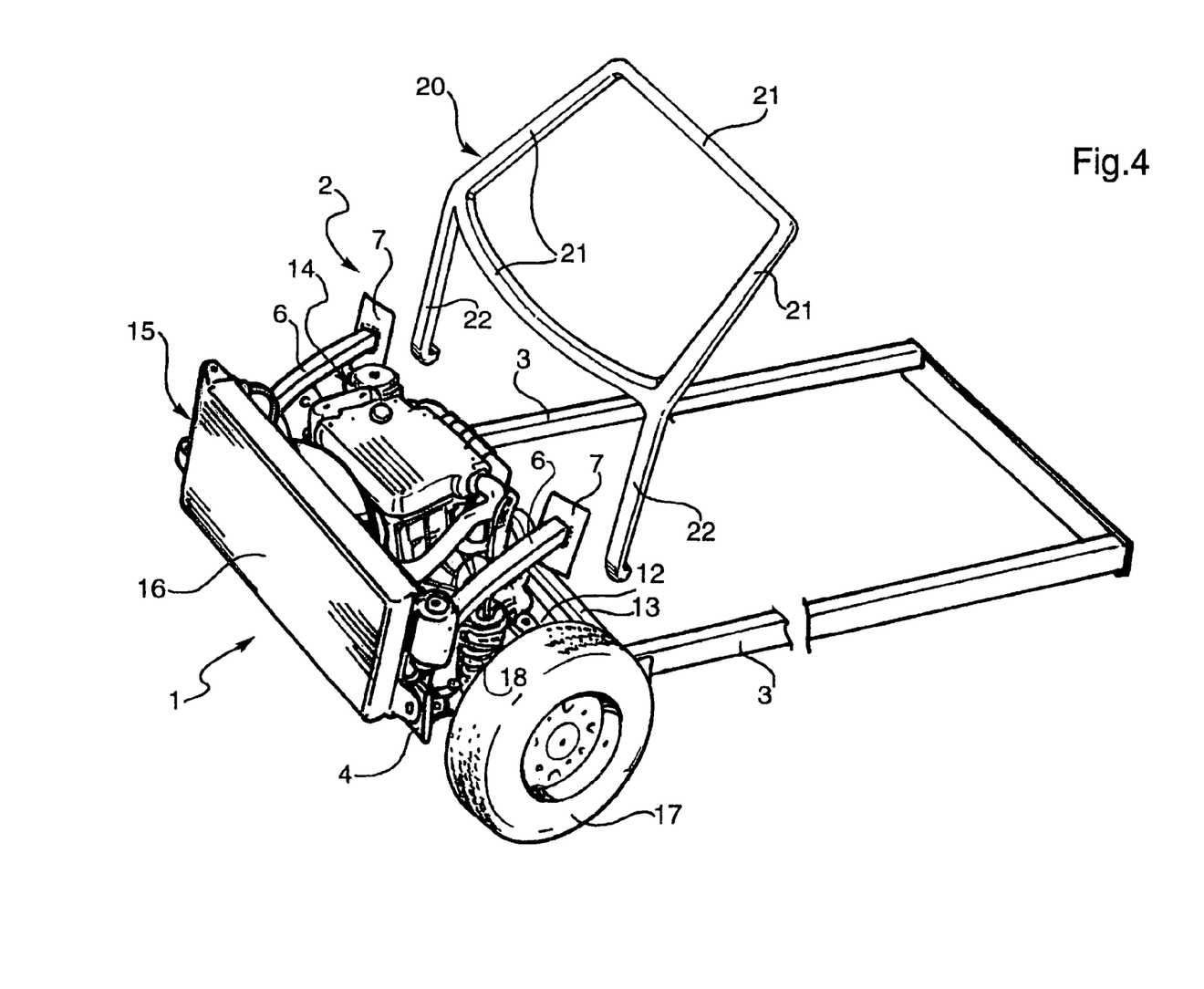
FIG. 4 is a partly exploded, partial perspective view showing the front module with an associated intermediate support structure, which is not assembled.

With reference to FIG. 4 and subsequent figures, a modular-structure motor vehicle according to the invention also includes an intermediate support structure generally indicated 20.

In the embodiment illustrated by way of example, this structure essentially comprises an annular frame 21 with two lower pillars 22. The frame 21 is intended to receive and support a glass windscreen (not shown) in a manner known per se.

Figure 5:
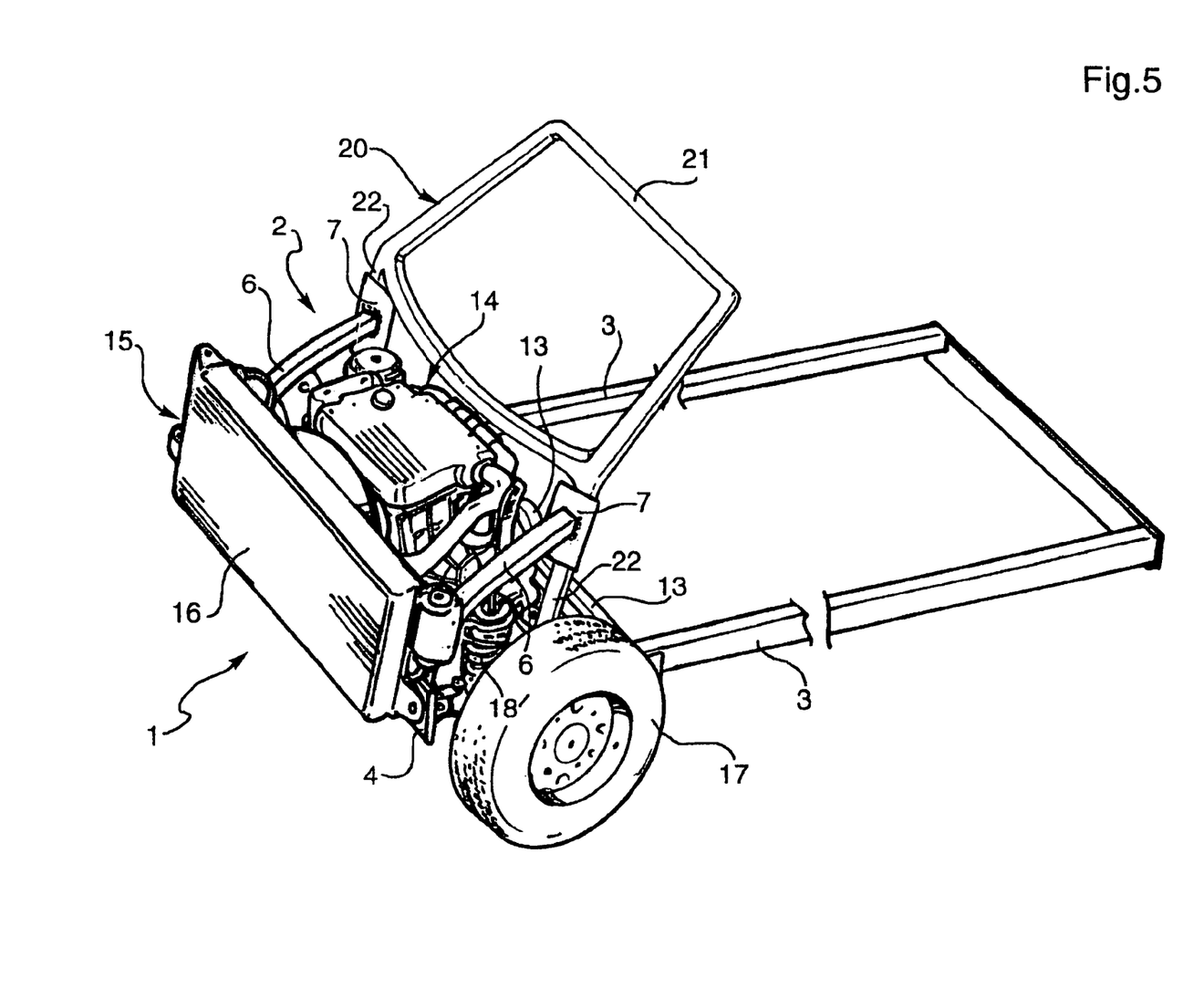
FIG. 5 is a perspective view similar to that of FIG. 4, showing the intermediate support structure fitted to the front module.

As can be seen better in FIG. 5, the intermediate support structure 20 can be assembled with the front module 1 described above by resting the pillars 22 on the end plates 7 of the structure 2 of the front module 1 and fixing them thereto (by welding for example), and by securing the lower ends of the pillars 22 to the longerons 3.

Figure 6:
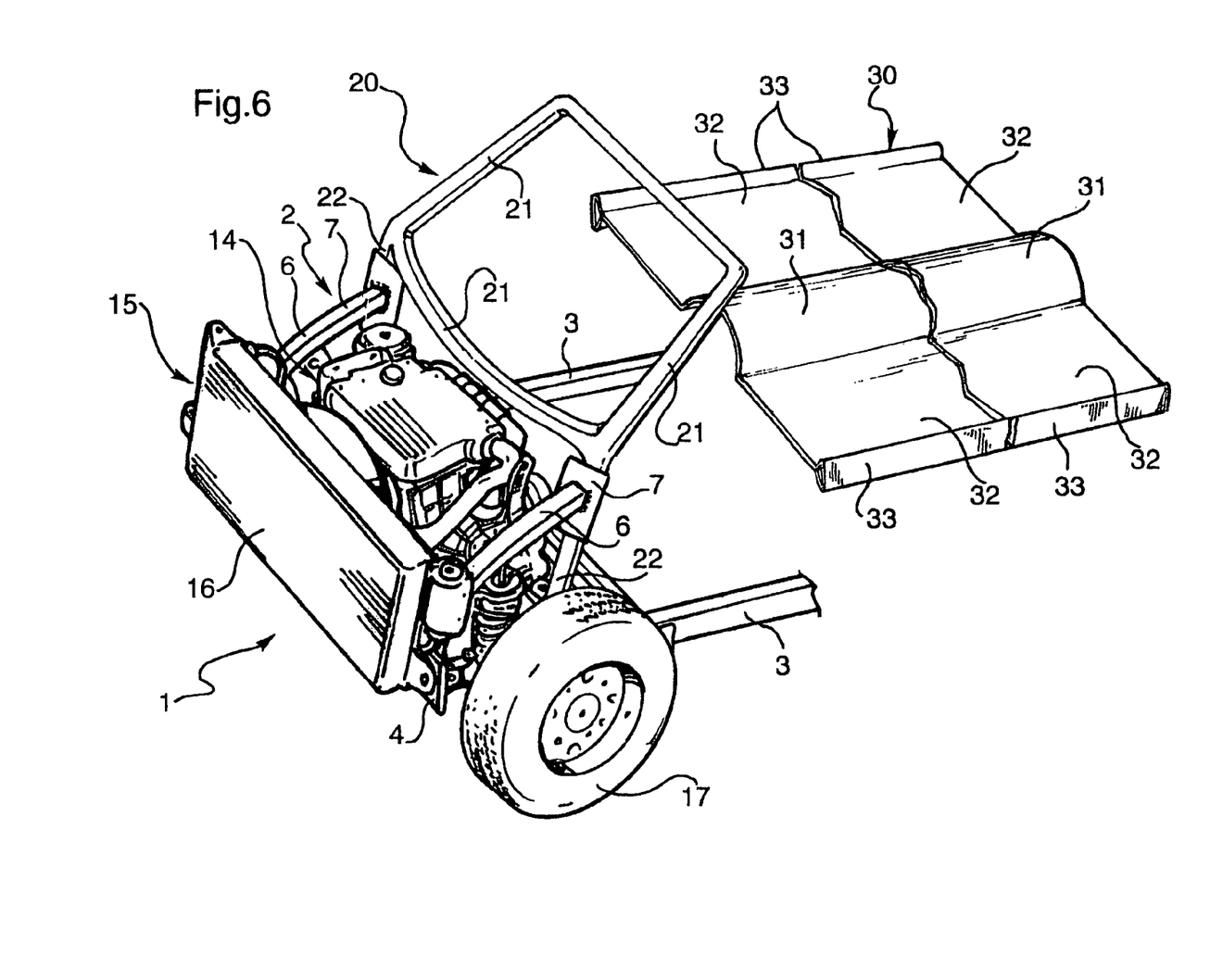
FIG. 6 is a perspective view showing the assembly of FIG. 5 as well as a floor structure intended to be fitted to the said assembly.
Figure 7:
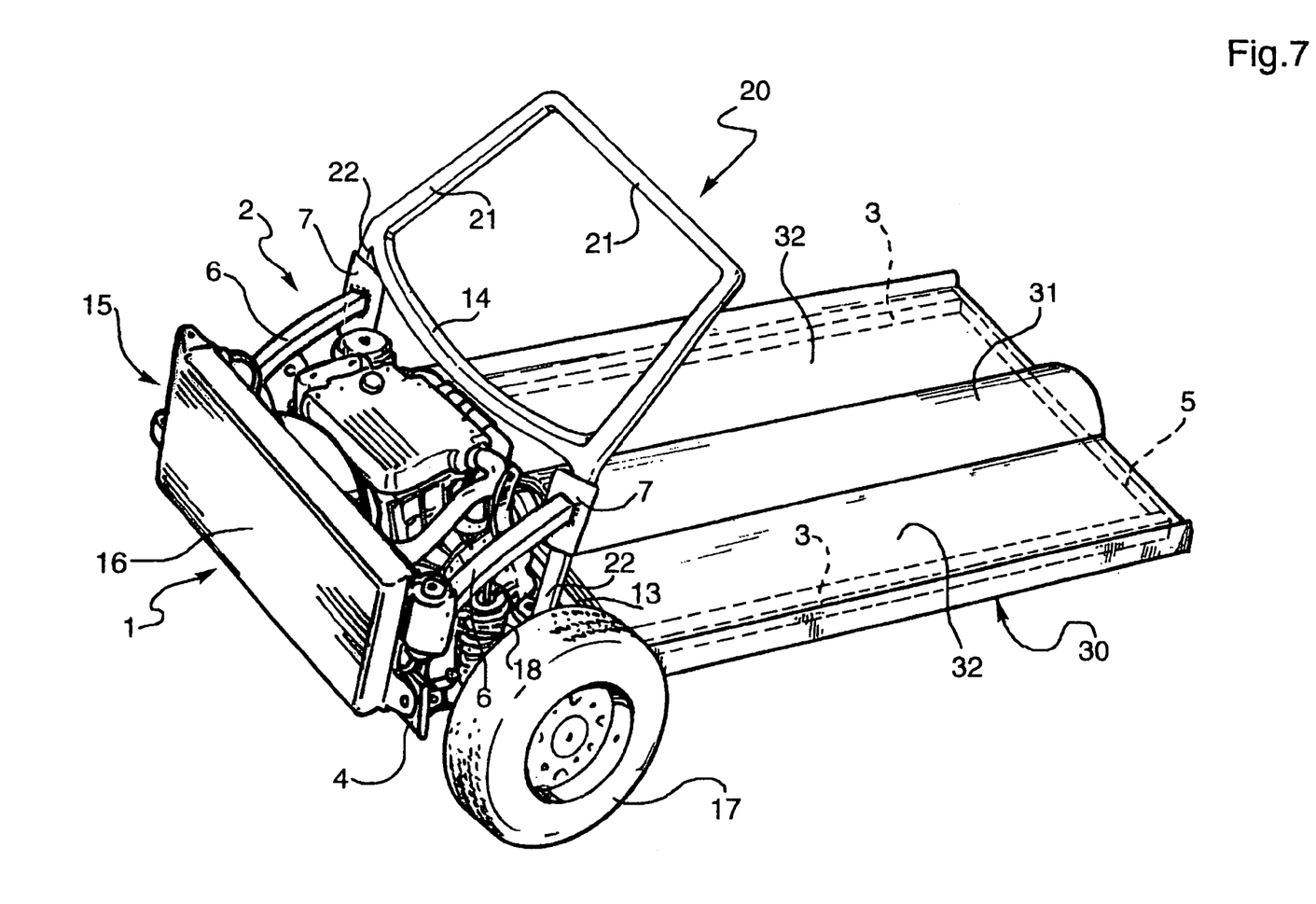
FIG. 7 is a perspective view showing the floor structure fitted to the aforesaid assembly.

With reference to FIGS. 6 and 7 and to subsequent figures, the motor vehicle also includes an essentially planar load-bearing floor structure, generally indicated 30, and made of shaped metal.

In the embodiment shown by way of example, the floor 30 has a central longitudinal portion 31, which is arcuate in cross section, being upwardly convex with a flat wing or sheet 32 to either side of this portion.

The floor 30 is fitted to the assembly of FIG. 5 by being placed on and secured to the longerons 3 (by welding for example) and by fixing the front edge of this floor 30 to the shaped cross member 13 (see FIG. 1) of the front module 1.

FIG. 7 shows the floor 30 fitted to the assembly of FIG. 5.

Figure 8:
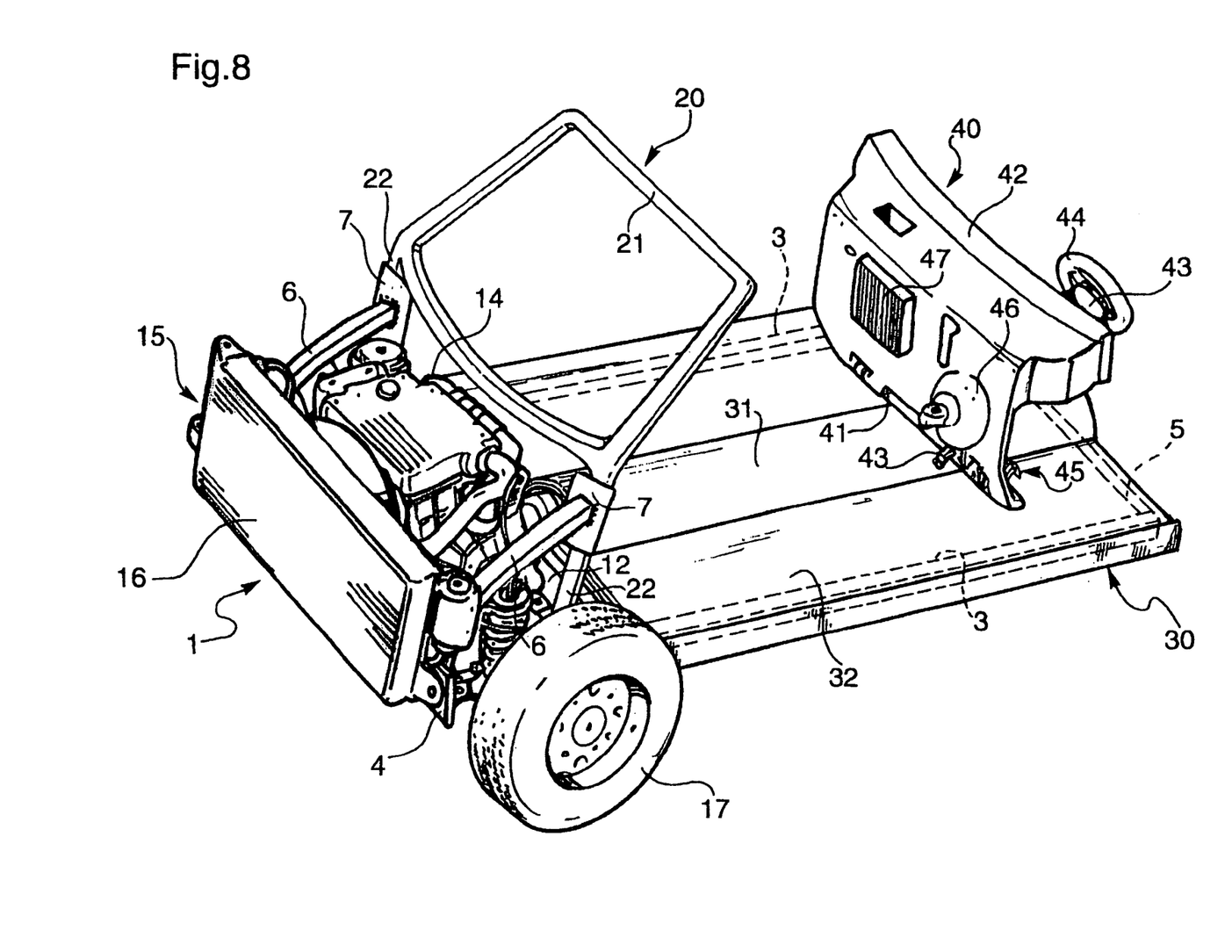
FIG. 8 is a perspective view showing the assembly formed by the front module, the intermediate support structure and the floor, as well as a pre-assembled intermediate module to be fitted to the said assembly.

In FIG. 8, and in subsequent figures, a second, or intermediate pre-assembled module is indicated 40.

Essentially, this module comprises a fire-wall 41 with various assemblies and devices fitted to it, such as an instrument panel 42, a steering column 43 with a steering wheel 44 and a control pedal assembly generally indicated 45.

In the embodiment illustrated by way of example, the intermediate module 40 also includes accessory devices such as a pneumatic power-assisted braking system 46 and a heat-exchanger assembly 47 for climate control in the passenger compartment of the motor vehicle.

Figure 9:
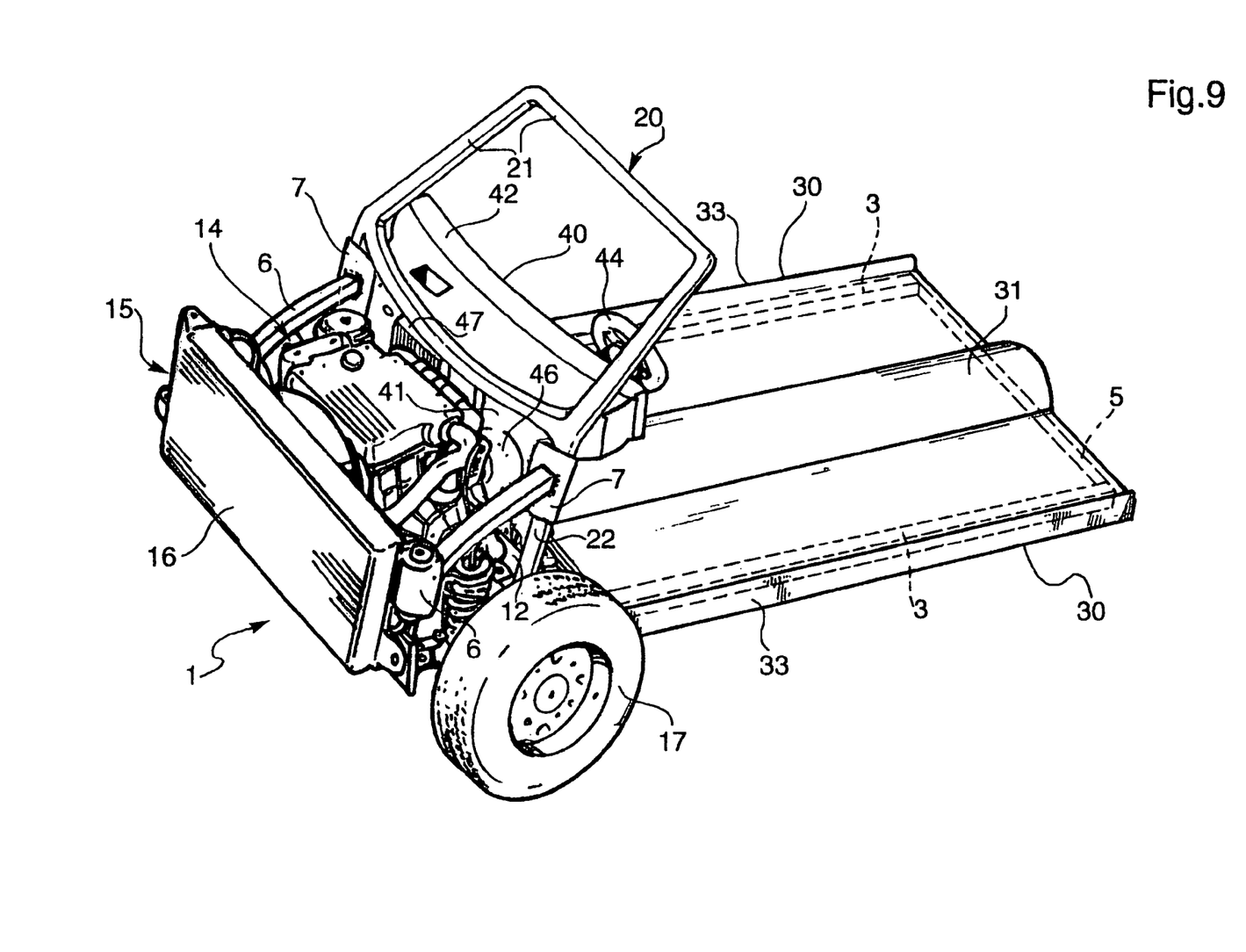
FIG. 9 is a perspective view showing the intermediate module once assembled.

During assembly, the intermediate module 40 is fitted to the intermediate support structure 20, as shown in FIG. 9.

In particular, the firewall is fixed to the pillars 22 of the structure 20, after coupling the devices of the module 40 to corresponding devices of the propulsion unit 14 and the front-wheel assembly 17. In particular, the steering column 43 is connected to a steering box (not shown in the drawings) which, for convenience, can be pre-fitted on the support cross member 12 (FIG. 1) of the front module 1.

Figure 10:
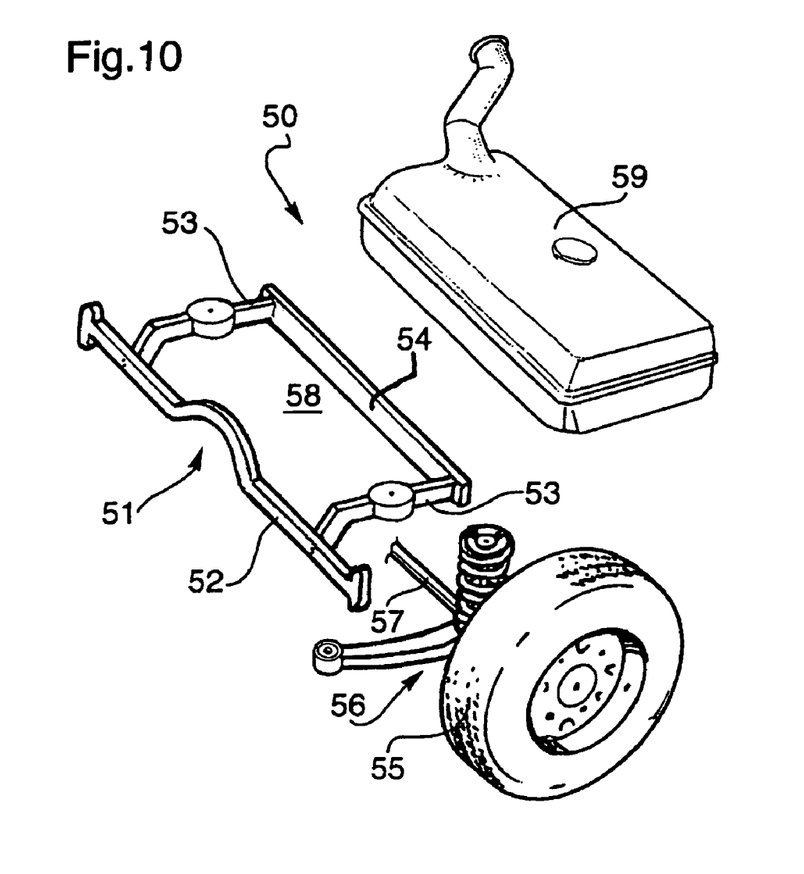
FIG. 10 is a partially exploded, partial perspective view showing a rear module of the vehicle.

In FIG. 10, and in subsequent figures, a third pre-assembled module, or rear module is indicated 50.

In the embodiment illustrated, the rear module 50 comprises a support frame 51 which includes a shaped front crossbeam 52 for coupling with the rear edge of the floor platform 30.

Two essentially parallel longitudinal arms 53 extend rearwardly from the shaped crossbeam 52, with their rear ends connected by a cross member 54.

The rear module 50 also includes two rear wheels 55 (only one of which is shown in FIG. 10) with associated suspension devices 56.

The suspensions of the rear wheels 55 can be of a type which includes a torsion bar, partially shown in FIG. 10 and indicated 57.

An area 58 (see FIG. 10) is formed inside the frame 51, between the cross members 52 and 54 and the longitudinal side arms 53, where one or more of a collection of various devices can be arranged, such as a fuel tank 59, a housing for a spare wheel and the like.

As an alternative to, or in addition to the fuel tank 59, an electric battery unit can be housed in the aforesaid space 58, possibly one suitable to supply electric power for running the motor vehicle on electricity.

Figure 11:
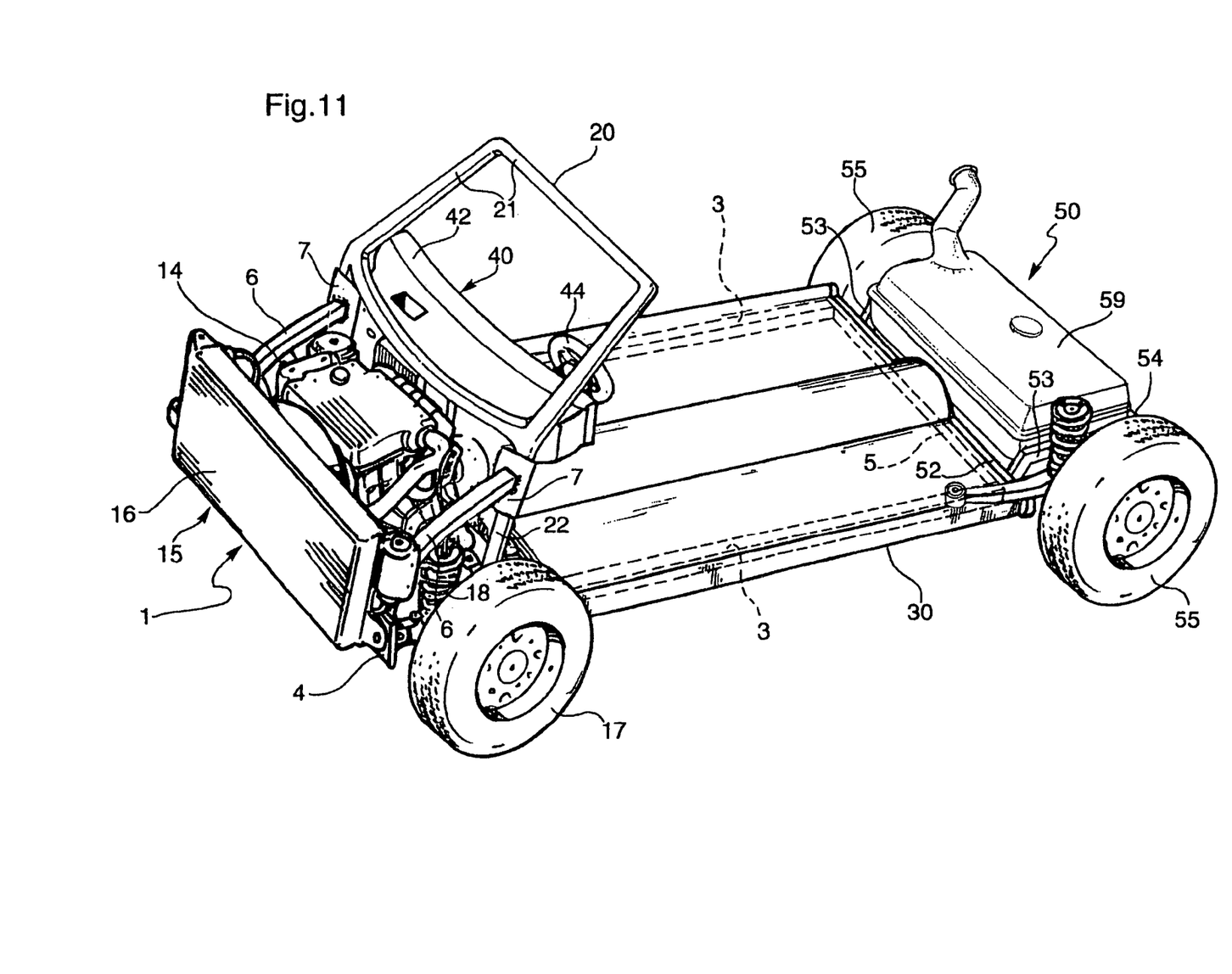
FIG. 11 is a perspective view showing the rear module assembled with the modules and components shown in the preceding drawings.

FIG. 11 shows the rear module 50 fitted to the assembly illustrated in FIG. 9.

Figure 12:
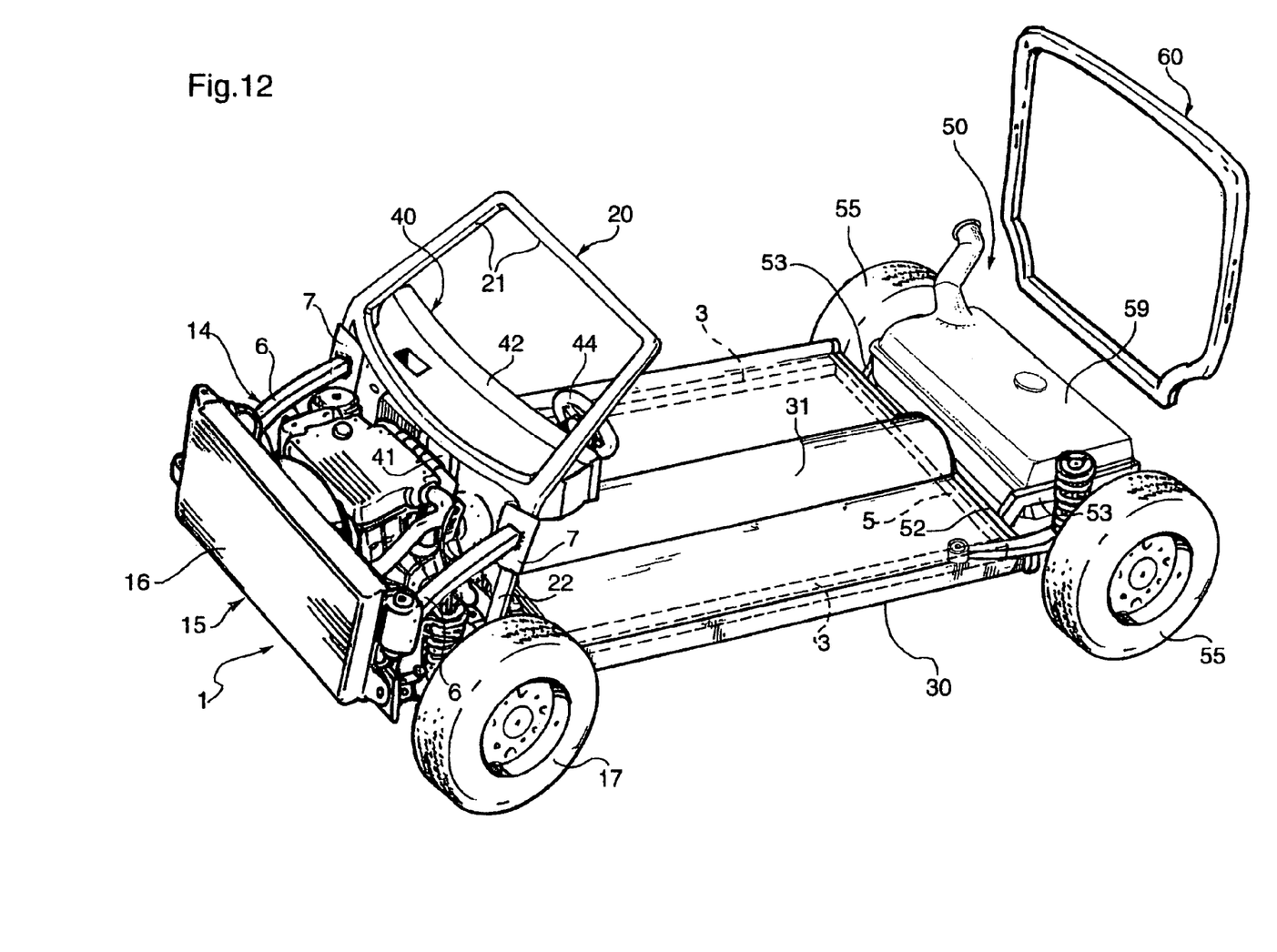
FIG. 12 shows the assembly of FIG. 11 with a rear annular structure for fitting to this assembly.
Figure 13:
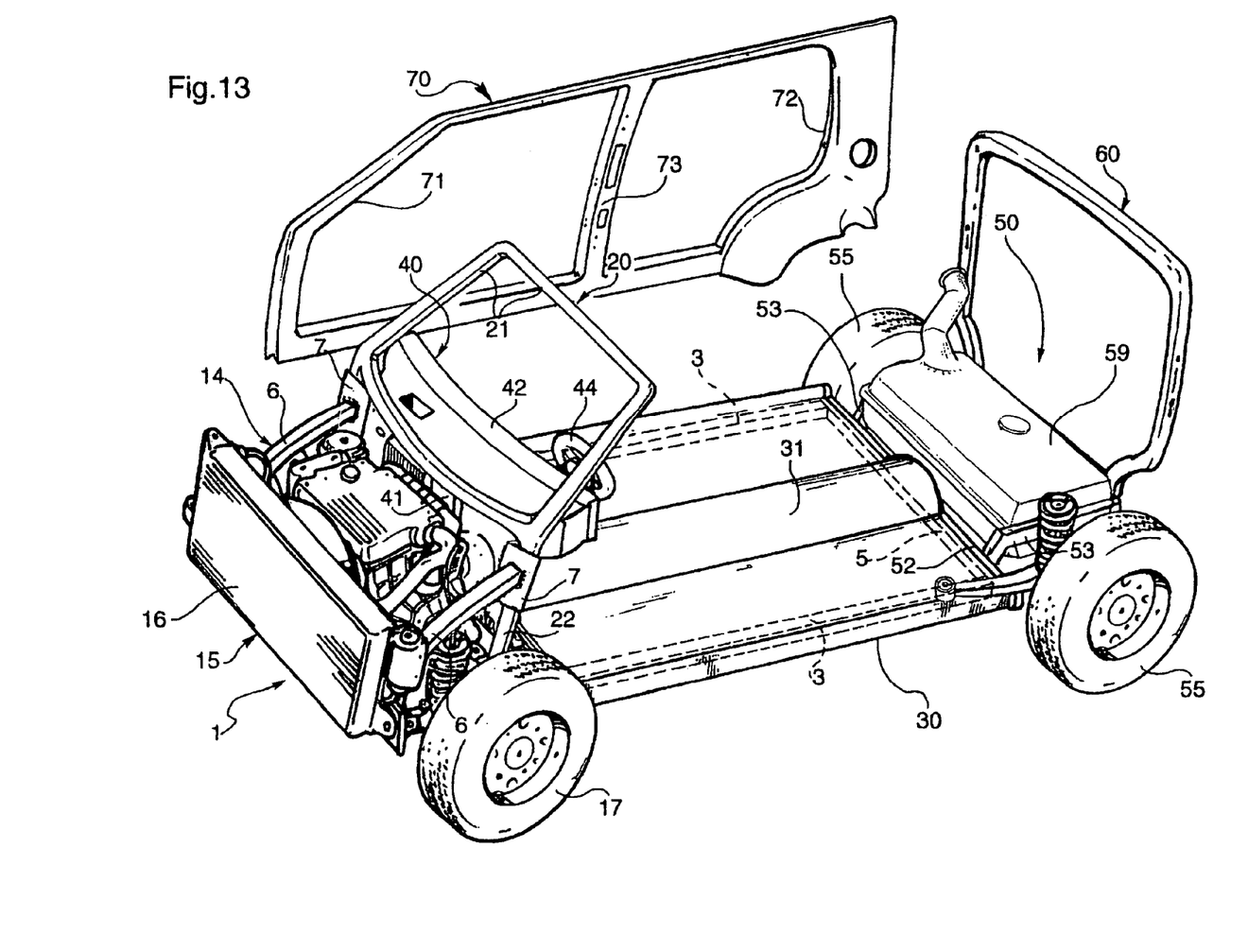
FIG. 13 shows the assembly of FIG. 12, assembled, with a side structure to be coupled to the said assembly.

An annular rear structure, indicated 60 in FIG. 12, is securely fixable to the cross member 54 of the module 50, as shown in FIG. 13.

The annular structure 60 can conveniently house a rear door, which can be opened by pivoting either about a horizontal or about a substantially vertical axis.

Alternatively, the annular rear structure 60 can be designed to receive a rear window glass, which may be openable or not, with a panel beneath it which can be fixed or can include an openable door.

The next stage in the assembly of the motor vehicle is the fitting of two side structures.

Figure 14:
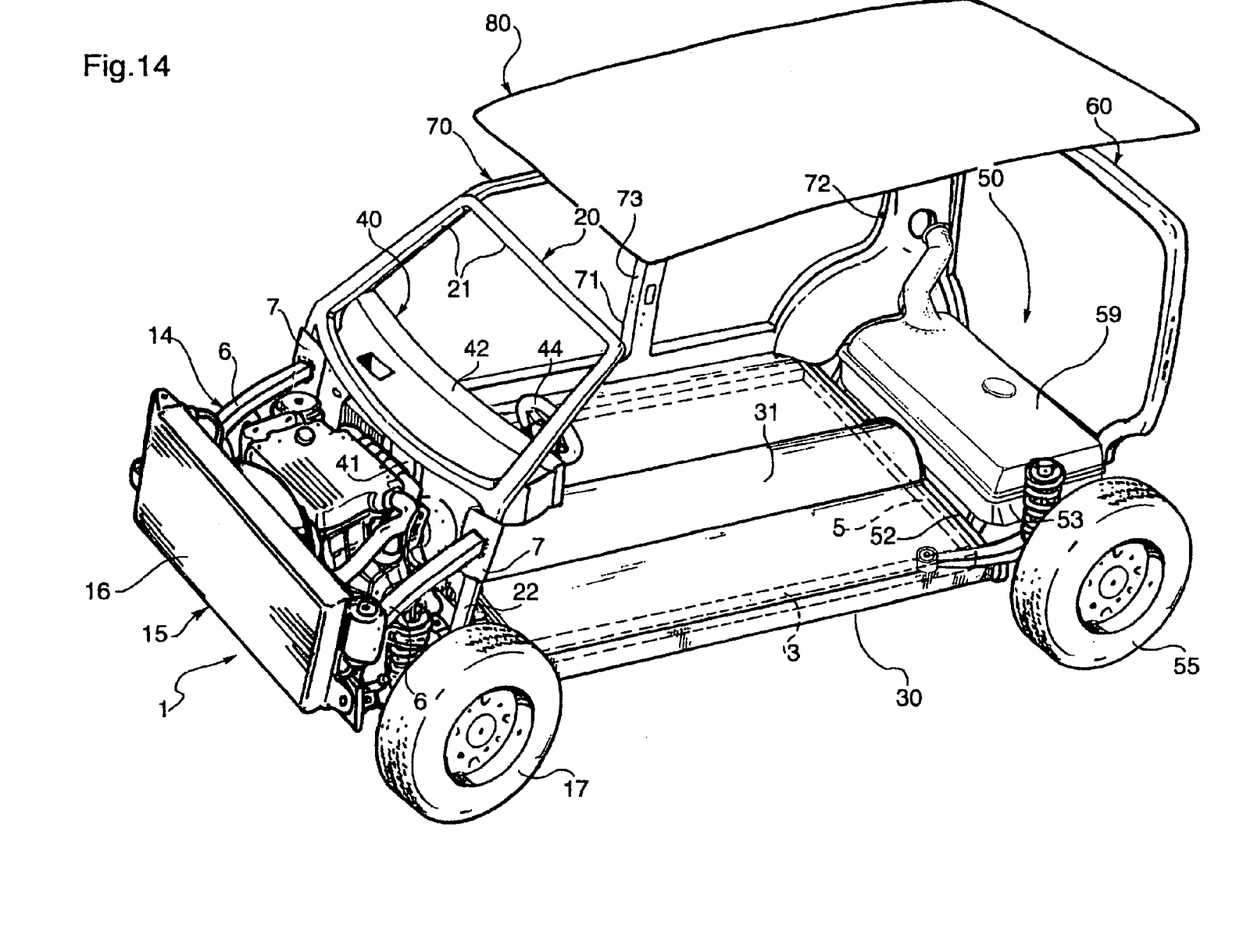
FIG. 14 is a perspective view showing the assembly of FIG. 13, assembled, with an upper closure panel, or roof, for to be coupled to the said assembly.

One of these side structures is indicated 70 in FIGS. 13 and 14.

In the embodiment illustrated by way of example, the side structure 70 defines two apertures 71, 72 separated by an essentially vertical intermediate pillar 73 and provided for receiving corresponding doors (not illustrated).

The side structures 70 are fixed, by welding for example, to the plates 7 of the front module 1, to the intermediate support structure 20, to the floor platform 30 and to the annular rear structure 60.

In FIG. 14, a closure panel or roof, indicated 80, preferably already fitted with an insulating layer on its lower surface, can be supported on and fixed, for example, by welding to the upper edges of the intermediate structure 20, the annular rear structure 60 and the side structures 70.

The motor vehicle is then finished by fitting the internal upholstery and accessory devices usually provided in the passenger compartment, as well as the body panels and the like, all by methods used in the art.

In a variant of the invention, at least in the case of the front module 1, the body panels, as well as a front bumper, can conveniently be pre-assembled as part of this module.

Naturally, the principle of the invention remaining unchanged, embodiments and manufacturing details may vary widely from those described and illustrated here purely by way of non-limitative example, without departing thereby from the scope of the invention, as claimed in the appended Claims.

The invention claimed is:

1. A motor vehicle having a modular structure, which includes
    a front pre-assembled module (1) which includes
    a first support structure (2) which includes a pair of essentially horizontal, parallel longerons (3);
    a propulsion unit (14) fixed to said support structure;
    a pair of steerable front wheels (17) coupled to said propulsion unit (14), together with associated suspension devices (18) fixed to said support structure (2);
    an intermediate support structure (20), fixed to the front module (1) and including an annular frame (21) for housing and supporting a windscreen;
    an essentially flat load-bearing floor structure (30) fixed to the longerons (3) of the front module (1);
    an intermediate pre-assembled module (40), fixed to the front module (1) and to said intermediate support structure (20) and which includes a firewall (41), an instrument panel (42), a steering column (43, 44) and a control pedal assembly (45);
    a rear pre-assembled module (50), fixed to the longerons (3) of the front module (1) and including a support frame (51), at least one pair of rear wheels (55) with associated suspension devices (56) fixed to said frame (51);
    an annular rear structure (60) fixed to the rear module (50), and
    two side structures (70) fixed by opposite edges to the intermediate support structure (20), the floor structure (30) and said annular rear structure (60).

2. A motor vehicle with a modular structure according to claim 1, in which the support structure (2) of the front module (1) also includes a front cross member (4), connected to said longerons (3), and to which are fixed a radiator (16) associated with the propulsion unit (14) and front optical assemblies of the vehicle.

3. A motor vehicle with a modular structure according to claims 1, in which said support structure (2) of the front module (1) also includes a rear cross member (5) which connects the rear ends of the aforesaid longerons (3).

4. A motor vehicle with a modular structure according to claim 1, in which the support (2) of the front module (1) includes two essentially symmetrical struts (6), each extending upwardly and rearwardly from the front end of a respective loneron (3); respective end plates (7) being fixed to the free ends of said struts (6) for connection with the aforesaid intermediate support structure (20).

5. A motor vehicle with a modular structure according to claim 4, in which a respective shaped strut (8), with means (9, 10) for fixing the suspension (18) of a corresponding front wheel (17), extends from an intermediate portion of each of said struts (6) of the support structure (2) of the front module (1) to the longeron associated (3) therewith.

6. A motor vehicle with a modular structure according to claim 5, in which each of said shaped struts (8) has means (11) for supporting and fixing the propulsion unit (14).

7. A motor vehicle with a modular structure according to claim 1, in which the support structure (2) of the front module (1) includes a support cross member (12), fixed to said longers (3) for supporting a steering box.

8. A motor vehicle with a modular structure according to claim 1, in which the support structure (2) of the front module (1) also includes a shaped member (13) fixed to said longerons (3) for coupling with one end of the floor structure (30).

9. A motor vehicle with a modular structure according to claim 4, in which the intermediate support structure (20) includes a pair of pillars (22) which depend essentially vertically from the lower portion of said frame (21) and are fixed to the support structure (2) of the front module (1).

10. A motor vehicle with a modular structure according to claim 9, in which the pillars (22) of the intermediate support structure (20) are fixed to said end plates (7).

11. A motor vehicle with a modular structure according to claim 1, in which a central longitudinal portion (31) of said floor structure is arcuate, and upwardly convex in cross section.

12. A motor vehicle with a modular structure according to claim 1, in which the frame (51) of the rear module (50) includes a front shaped beam (52) for coupling with the rear edge of the floor structure (30).

13. A motor vehicle with a modular structure according to claim 12, in which a region (58) is defined within the frame (51) of the rear module (50) for housing a fuel tank (59), a housing for a spare wheel and an accumulation battery unit.

14. A motor vehicle with a modular structure according to claim 1, further including an upper closure panel or roof (80), fixed to the top edges of the intermediate structure (20), the annular rear structure (60) and the side structures (70).

15. A method for assembling a motor vehicle, comprising the steps of
   pre-assembling a first or front module (1) comprising
      a first support structure (2) including a pair of essentially horizontal, parallel longerons (3);
      a propulsion unit (14) fixed to said support structure;
      an assembly of steerable front wheels (17) coupled to said propulsion unit (14), with associated suspension devices (18) fixed to said support structure (2);
   pre-assembling an intermediate support structure (20) which includes an annular frame (21) for housing and supporting a windscreen;
   providing an essentially planar load-bearing floor structure (30);
   pre-assembling a second or intermediate module (40) which includes a firewall (41), an instrument panel (42), a steering column (43, 44) and a control pedal assembly (45);
   pre-assembling a third or rear module (50) which includes a support frame (51), at least one pair of rear wheels (55) and associated suspension devices (56, 57) fixed to said frame (51);
   fixing the intermediate support structure (20) to the aforesaid front module (1);
   fixing the floor structure (30) to the longerons (3) of the front module (1);
   fixing said intermediate module (40) to the front module (1) and to the aforesaid intermediate support structure (20), coupling the steering column (43, 44) and the pedal assembly (45) to corresponding devices of the propulsion unit (14) and of the front wheel assembly (17); and
   fixing the rear module (50) to the longerons (3) of the front module (1).

16. A method for assembling a motor vehicle according to claim 15, further comprising the steps of:
   providing an annular rear structure (60) and at least two side structures (70), and
   after fixing the rear module (50) to the front module (1), fixing the annular rear structure (60) to the rear module (50) and fixing the side structures (70) to the front module (1), the intermediate support structure (20), the floor structure (30) and the annular rear structure (60).

17. A method for assembling a motor vehicle according to claim 15, in which at least the front module (1) is pre-assembled with a plurality of body panels, including any bumper.

* * * * *